United States Patent [19]

Yokozeki

[11] 4,336,433
[45] Jun. 22, 1982

[54] HEATING CONTROL APPARATUS FOR COOKING OVEN WITH VAPOR SENSOR

[75] Inventor: Seiki Yokozeki, Yamatokoriyama, Japan

[73] Assignee: Matsushita Electric Industrial Co., Ltd., Osaka, Japan

[21] Appl. No.: 168,338

[22] Filed: Jul. 11, 1980

[30] Foreign Application Priority Data

Jul. 11, 1979 [JP] Japan .................... 54-88584

[51] Int. Cl.$^3$ .................................. H05B 6/68
[52] U.S. Cl. .................. 219/10.55 B; 219/10.55 R; 99/325; 73/336.5
[58] Field of Search .............. 219/10.55 B, 10.55 M, 219/10.55 E, 10.55 R, 518; 99/468, 486, 451, DIG. 14, 325, 327, 330, 335; 426/243, 523; 73/355 K, 362.8

[56] References Cited

U.S. PATENT DOCUMENTS 4,118,985  10/1978  Compton ..................... 73/355 R
4,259,866   4/1981  Sleighter .................... 73/355 R Primary Examiner—B. A. Reynolds
Assistant Examiner—Philip H. Leung
Attorney, Agent, or Firm—Spencer & Kaye

[57] ABSTRACT

A heating control apparatus includes a vapor sensor for detecting the vapor liberated from the food to be cooked and a microcomputer for controlling the heating sequence in response to a signal from the vapor sensor for automatic heating control suitable for the food. The time $T_1$ from the heating start to the detection by the vapor sensor of the vapor liberated from the food is counted by the microcomputer. A constant K determined according to the type of food which is determined by cooking tests in advance and which is stored in the microcomputer is selected in connection with the time $T_1$. The time $T_1$ is multiplied by the selected constant K to determine the time $T_2$ from the detection of vapor by the vapor sensor to the end of cooking by heating. The food heating sequence is controlled by the microcomputer, especially, utilizing the facts that the time $T_1$ is proportional to the volume of the food of the same type and that the constant K is not fixed for the same food but varies with the volume thereof.

2 Claims, 11 Drawing Figures

F I G. 3
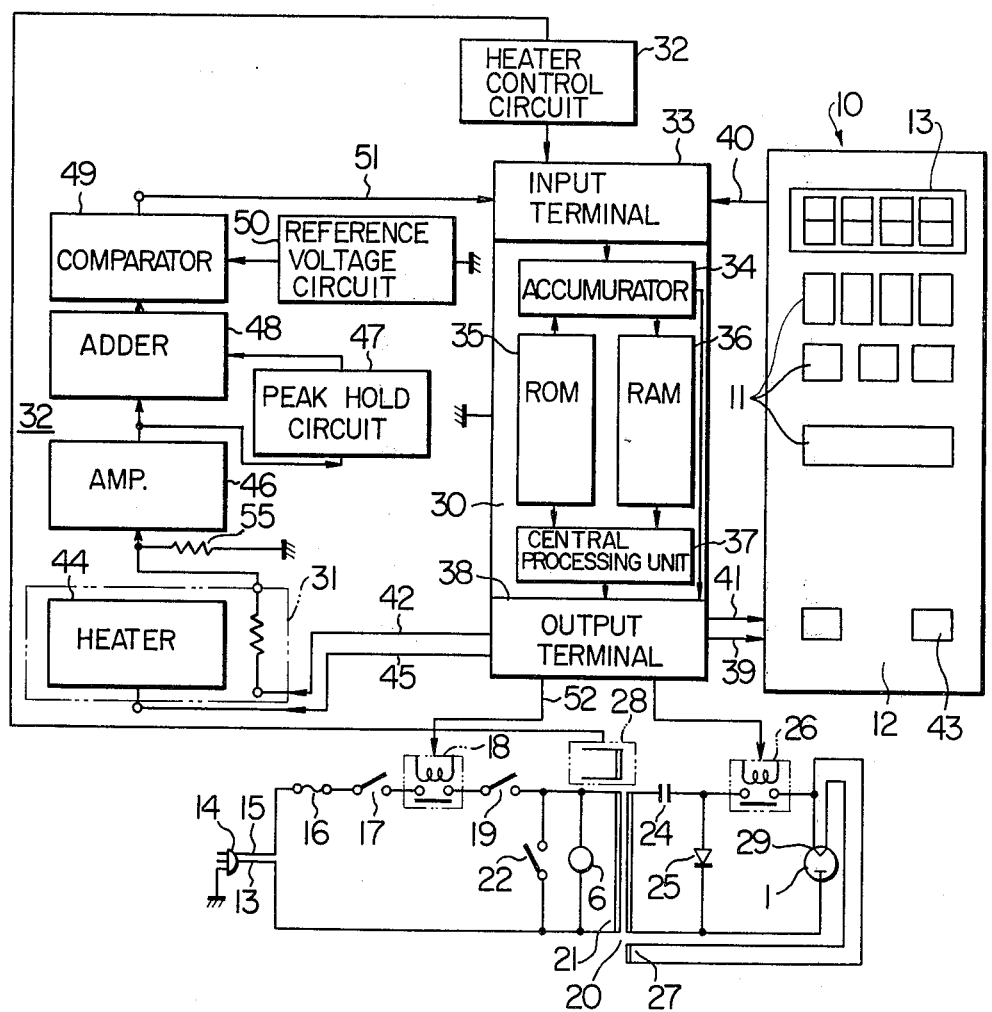

HEATING CONTROL APPARATUS FOR COOKING OVEN WITH VAPOR SENSOR

This invention relates to a heating control apparatus for cooking ovens.

A microwave oven with the operating sequence thereof controlled by a microcomputer has recently been commercially produced. For setting the heating cooking mode with the microcomputer, the operator is required to operate a plurality of heating output setting keys or heating time setting keys for setting the heating output or the heating time. This inconveniently complicates the setting operation.

As disclosed in U.S. Pat. No. 4,097,707, a humidity or vapor sensor and a microcomputer are combined with each other. Constants K specific to various food items to be cooked which are experimentally obtained in advance are stored in the microcomputer. At the point in time when vapor liberated from the food is detected by the vapor sensor, the time length $T_1$, which is measured from the start of heating to the instant when vapor is detected by the vapor sensor and the constant K specific to the particular food are used by the microcomputer to calculate another time length $T_2$ from the end of the time $T_1$ to the end of total heating. A cooking control apparatus in which the heating sequence is automatically controlled by the microcomputer on the basis of the total heating time length of $T_1+T_2$ has been developed.

This prior art heating control apparatus is capable of automatic control and therefore is conveniently used. Subsequent repeated cooking experiments, however, have revealed that the finished conditions of the food are not uniform for more than a certain amount of the food.

Investigations into the cause of this non-uniformity show that as mentioned later the constant K specific to each food item stored in the microcomputer undergoes a great variation for the food which exceeds a certain level in amount. It has also been known that the amount of food to be cooked is proportional to the time $T_1$ required before detection of vapor by the vapor sensor.

Accordingly, the primary object of the present invention is to provide a heating control apparatus in which the relation between the amount of various food items and the constant K which is obtained from cooking tests in advance are used to selectively calculate the time $T_1$ proportional to the amount or volume of the food and the constant K associated with the time $T_1$, thus determining an accurate cooking time.

Another object of the present invention is to provide a heating control apparatus in which a microcomputer is used to store data representing the relation between the time length $T_1$ and each constant K, to calculate the heating time, and to execute the sequence control of the cooking by heating.

A further object of the present invention is to provide a heating control apparatus in which the heating time is counted in units based on the power frequency.

The above and other objects, features and advantages will be made apparent by the detailed description taken in conjunction with the accompanying drawings, in which:

FIG. 3 is a diagram showing a circuit of the same microwave oven;

A microwave oven according to the present invention will be described with reference to FIGS. 1 and 2.

Figure 2:
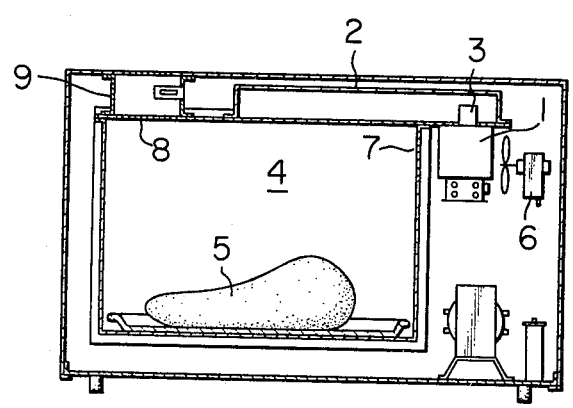
FIG. 2 is a longitudinal sectional view of the microwave oven shown in FIG. 1.

In FIG. 2, reference numeral 1 shows a high frequency oscillator such as a magnetron for generating microwave energy oscillating at a frequency of 2450 MHz. This high frequency oscillator 1 is connected to a waveguide 2 through an antenna 3, so that the microwave energy radiated in the waveguide by the high frequency oscillator 1 is propagated through the waveguide 2 and radiated into a heating chamber 4. The microwave energy radiated into the heating chamber 4 is absorbed by the food to be cooked which is disposed in the heating chamber 4, thus heating the food 5 from the inside thereof.

The high frequency oscillator 1 is subjected to self-heating by internal loss, and is thus kept cooled by a blower fan 6 for preventing the damage thereof during oscillation. The air sent out by the blower fan 6 cools the high frequency oscillator 1 and is supplied to the heating chamber 4 through a small aperture 7 formed in the wall of the heating chamber 4. The air supplied to the heating chamber 4, carrying the vapor generated from the food 5 heated by the microwave energy, is exhausted out of the microwave oven through another small aperture 8 formed in the wall of the heating chamber 4 and also through an exhaust guide 9 communicating the heating chamber 4 with the outside of the microwave oven.

Figure 1:
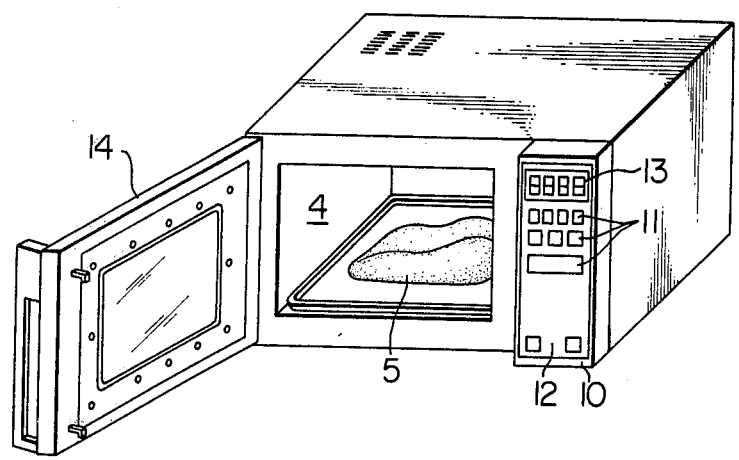
FIG. 1 is a perspective view of a microwave oven according to an embodiment of the present invention with the door thereof open.

Numeral 10 in FIG. 1 shows a control panel incorporating a keyboard 12 on which are arranged a plurality of key pads 11 for the operator to set a heating output, a heating time and a heating mode, and a display tube 13 such as an LED display tube or a fluorescent display tube for indicating the set condition of the heating output, heating time and cooking mode. Numeral 14 in FIG. 1 shows a door mounted to open or close as desired for placing the food into and taking it from the heating chamber 4.

The foregoing is a description of the construction of a microwave oven according to the present invention. Next, a circuit diagram of the microwave oven will be explained with reference to FIG. 3.

The microwave oven is connected to an ordinary home socket outlet and is supplied with power from a power plug 14. One terminal 15 of the power plug 14 is connnected to a fuse 16 which is adapted to be broken by the shorting of an electric component provided in the microwave oven, or the grounding thereof or the operation of a shorting switch for preventing excessive leakage of microwave energy at the time of fusion of interlocks explained later. The fuse 16 is further connected to an interlock 17 with the contact thereof opened or closed by the operation of the door 14. The interlock 17 is connected to a relay 18 which is turned on in response to a heating start command of the microcomputer and turned off in response to a heating end or suspension command issued by the microcomputer. The relay 18 in turn is connected to an interlock 19 with the contact thereof adapted to be operated by the operation of the door 14. The interlock 19 is connected to a primary winding 21 of a high voltage transformer 20. The ends of the primary winding 21 of the high voltage transformer 20 are connected with the blower fan 6 for cooling the microwave oscillator 1 and a shorting switch 22 activated to render the entire circuit inoperative at the time of fusion of the interlocks 17, 19. The other terminal 13 of the power supply plug 14 is connected to the primary winding 21 of the high voltage transformer 20 directly. The AC power applied to the high voltage transformer 20 is stepped up by the high voltage transformer 20 to a high voltage power. This high voltage power is converted into a high voltage DC power rectified to double voltage by a double voltage rectifier circuit including a high voltage capacitor 24 and a high voltage diode 25. The resulting high voltage DC power is supplied to the high frequency oscillator 1 through a high voltage switch 26 which intermittently changes the microwave output. The high voltage DC power supplied to the high frequency oscillator 1 is converted into microwave energy in the high frequency oscillator 1 and propagated by way of the antenna 3. Then, the microwave energy heats the food 5 through the processes described above.

The high voltage transformer 20 includes a cathode heater winding 27 and a fourth winding 28. The cathode heater winding 27 is connected to a cathode 29 of the high frequency oscillator 1 for heating the heater. The fourth winding 28, on the other hand, detects that the door 14 is opened during cooking, that the interlocks 17 and 18 are turned off and that AC power supply to the primary winding 21 of the high voltage transformer 20 is stopped, with the result that the data detected are applied to the microcomputer 30 for turning off the final relay 18. The relay 18 and high voltage switch 26 are turned on and off in response to a command from a control circuit.

Apart from the main circuit of the microwave oven according to the invention described above, the control circuit will be explained below with reference to FIG. 3.

In FIG. 3, numeral 30 shows the microcomputer which plays a central role in the control circuit. The microcomputer 30 controls an external circuit, analyzes and calculates the data obtained from the external circuit, and controls the external circuit on the basis of the result of the analysis and calculation. The microcomputer 30 comprises an input terminal 33 for receiving the data on the cooking output, cooking time and cooking mode from the keyboard 11, a cooking suspension command from the fourth winding 28 of the high voltage transformer 20, and data from the control circuit 32 of the vapor sensor 31; an accumulator 34 for temporarily storing these data and a command for various purposes including comparison with the data stored in a ROM 35 region mentioned later, transfer to a RAM 36 and transfer to a central processing section. The ROM 35 stores the command, information and data required for control of the system as a whole and the RAM 36 sequentially stores the information and data transferred from the input terminal 33. A central processing section 37 analyzes and calculates the command, information and data of various kinds and an output terminal 38 produces an output signal to control the external circuit on the basis of the data thus calculated.

The output terminal 39 of the microcomputer 30 supplied an output signal to the keyboard 12, so that the particular output signal is supplied to the input terminal 40 of the microcomputer 30 upon depressing by the operator of the desired key pad 11 on the keyboard 12. The signal transferred to the input terminal 40 is temporarily stored in the accumulator 34, and compared with the data of ROM 35, transferred to RAM 36 where it is stored, or transferred to the central processing section 37 for calculations. In some cases, the signal thus calculated is supplied from the output terminal 38 to the external circuit thereby to drive the same.

The output terminal 41 of the microcomputer 30 supplies an output signal to the display tube 13 of the control panel 10, thus indicating the cooking output, cooking time and cooking mode on the display tube 13.

The basic operation of the control circuit is explained above. Now, the control of the humidity or vapor sensor and the control circuit according to the present invention will be described below specifically with reference to FIG. 3.

An output signal for the vapor sensor 31 is delivered from the output terminal 42 of the microcomputer 30. This output signal is applied to the vapor sensor 31 at and from the time point of heating start when the start pad 43 on the keyboard 12 is depressed. The vapor sensor 31 is mounted on the above-mentioned exhaust guide 9 and continuously detects the change in humidity of the air exhausted from the heating chamber 4. The vapor sensor 31 is a kind of resistor, the resistance of which undergoes a change by absorbing moisture from the ambience. When the humidity of the environment is high, the vapor sensor 31 adsorbs more moisture so that the resistance value thereof is reduced. When the humidity is low, on the other hand, less moisture is adsorbed and the resistance value thereof is high. A vapor sensor having the above-mentioned characteristics is generally well known.

It is also well known that the resistance value of the vapor sensor 31 is also increased by adsorbing the airborne dust and oil discharged from the food being cooked in addition to the moisture. For this reason, a heater 44 is wound around the vapor sensor 31 for burning off the dust and like contamination. The heater 44 is actuated to cleaning by heating the vapor sensor 31 by being supplied with power from the heater control circuit 32 driven by an output signal from the output terminal 45 of the microcomputer 30 which is produced immediately after heating start. Generally, this cleaning by heating requires a temperature of 450° C. or higher. Therefore, power is supplied to the heater 44 for several seconds and controlled by the microcomputer 30.

The signal voltage supplied to the vapor sensor 31 is divided by a dividing resistor 55 connected in series with the vapor sensor 31. The signal voltage thus divided is amplified by an amplifier 46 and is applied to a peak hold circuit 47 and an adder 48 in the next stage. The peak hold circuit 47 is for storing the minimum value of the signal voltage applied from the amplifier circuit 46 and produces the minimum value of the input voltage thereof in reverse polarity. This output voltage is applied to the adder 48. In the adder 48, the output voltages from the amplifier 46 and the peak hold circuit 47 are added to each other and the resulting sum thereof is applied to the comparator 49 in the next stage. The comparator 49 compares the sum obtained at the adder 48 with a reference voltage from a reference voltage circuit 50, and in the case where the sum voltage is larger than the reference voltage, an output voltage is produced at the output terminal of the comparator 49. The output terminal of the comparator 49 is connected with the input terminal 51 of the microcomputer 30. Also the output terminal 52 of the microcomputer 30 is connected with the above-mentioned relay 18 which is so controlled by the microcomputer 30 as to close upon application of a heating start input signal to the input terminal 40 of the microcomputer 30 through the keyboard 12 and to open upon completion of the heating. The microcomputer 30 receives the output voltage from the comparator 49, and multiplies the heating time counted internally at that time point by a constant specific to the food 5 (FIGS. 1, 2) being cooked, thus calculating immediately the subsequent heating time. Further, the microcomputer 30 counts the heating time thus calculated, and when the heating time is consumed, opens the relay, thus ending the heating process.

Figure 4:
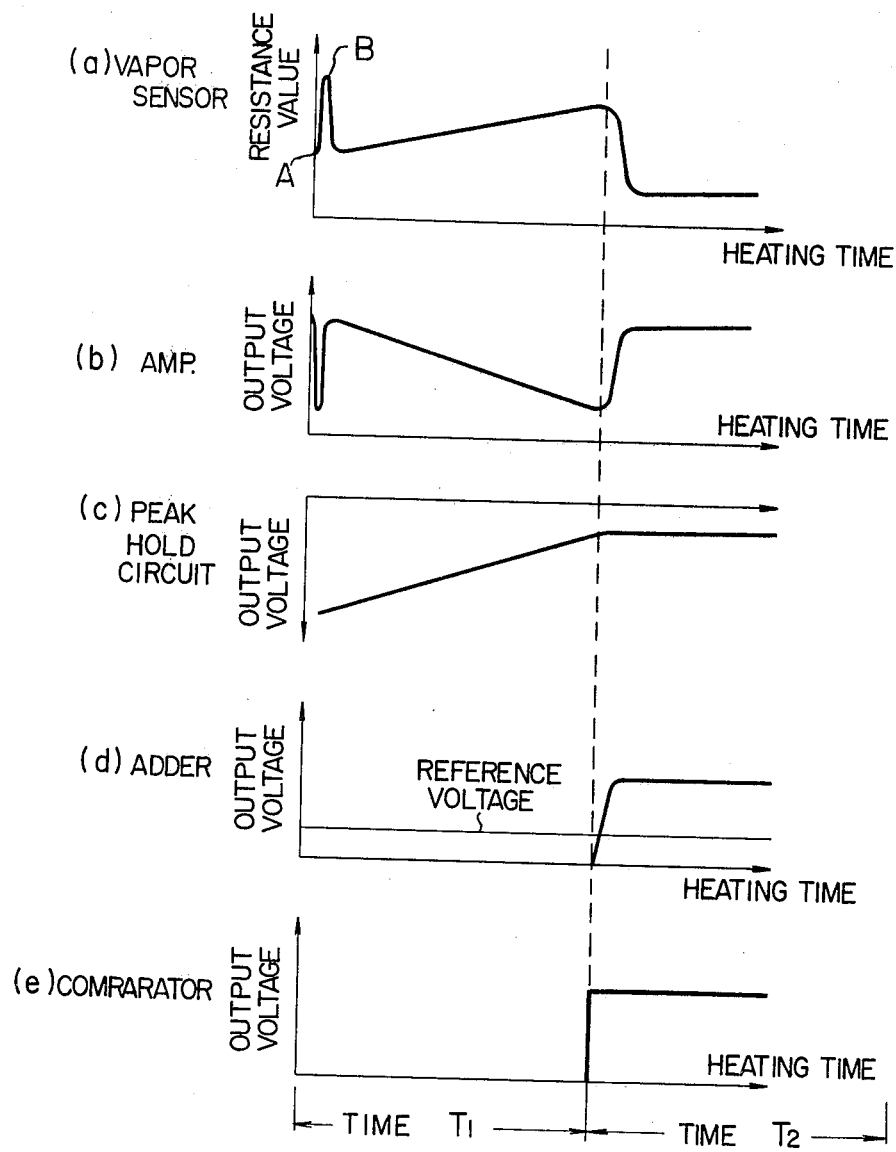
FIG. 4 shows waveforms of output voltages produced at various points in the circuit of FIG. 3.

The relation between the output voltages of the various parts of the control circuit of the vapor sensor 31 and the heating time will be explained below with reference to FIG. 4. In FIG. 4 at (a) there is shown a curve of change in the resistance value of the vapor sensor 31, in FIG. 4 at (b) the change in output voltage of the amplifier 46, in FIG. 4 at (c) the output voltage of the peak hold circuit 47, in FIG. 4 at (d) the output voltage of the adder 48, and in FIG. 4 at (e) the output voltage of the comparator 49.

The resistance value of the vapor sensor 31 at the time point when the microwave oven starts operating substantially represents the humidity of the external air of the microwave oven (point A). At the next moment, the vapor sensor 31 is subjected to cleaning by heating for several seconds. At this time, in view of the fact that the temperature of the air around the vapor sensor 31 increases, the humidity of the air around the vapor sensor 31 decreases and the resistance value of the vapor sensor 31 increases (point B). After the cleaning by heating for several seconds, the power supplied to the heater 44 of the vapor sensor 31 is cut off by the control of the microcomputer 30. As a result, the air temperature around the vapor sensor 31 begins to decrease slowly until it lowers to the original temperature after several tens of seconds, thus substantially restoring the humidity as of the time point immediately before the cleaning by heating. The resistance value of the vapor sensor 31 is restored almost to the value of point A. The food absorbs the microwave energy and begins to be slowly heated from the surface thereof. The output voltages produced at various parts under this condition are shown in FIG. 4 at (b) to (e). With the progress of heating, the air that has cooled the microwave oven is supplied from the heating chamber 4 to the exhaust guide 9 mounted with the vapor sensor 31, and therefore the temperature of the air around the vapor sensor 31 gradually increases. As a result, the humidity of the air around the vapor sensor 31 slowly decreases, thus gradually increasing the resistance value of the vapor sensor 31. The output voltage of the amplifier 46 drops accordingly as shown at (b) in FIG. 4, so that the output voltage of the peak hold circuit 47 for storing the minimum value of the output voltage of the amplifier and producing the voltage of reverse polarity of the particular minimum value gradually increases as shown at (c) in FIG. 4. The output voltage of the adder 48 is a sum of the output voltage of the amplifier 46 and the output voltage of the peak hold circuit 47 producing a voltage of reverse polarity of the amplifier 46 and therefore is zero voltage as shown at (d) in FIG. 4. With further progress of heating of the food, the resistance value of the vapor sensor 31 reaches a maximum just before liberation of vapor from the food, so that the output voltage of the amplifier 46 and the output voltage of the peak hold circuit 47 reach a minimum value and a maximum value respectively as shown at (a) and (b) in FIG. 4. When the food begins to liberate vapor with even further progress of heating, the humidity in the heating chamber 4 increases, with the result that the humidity of the air around the vapor sensor 31 becomes high, thus sharply reducing the resistance value of the vapor sensor 31. The output voltage of the amplifier 46 sharply rises. The peak hold circuit 47, however, maintains the output voltage level of just before liberation of vapor and thus continues to produce the maximum value thereof. Thus, the output voltage of the adder 48 for adding the output voltages of the amplifier 46 and the peak hold circuit 47 to each other turns upward. In the comparator 49, the output voltage of the adder 48 that has turned upward and the reference voltage are compared with each other, and in the case where the output voltage of the adder 48 is higher than the reference voltage, an output is produced from the output terminal of the comparator 49. This output is applied to the microcomputer 30. At this time point, the microcomputer 30 decides that vapor has been liberated, multiplies a constant K by the heating time $T_1$ that has thus far been counted in the microcomputer 30 from the start of heating, and thus the heating time $T_2$ required after detection of vapor is calculated. The food continues to be heated further for the heating time $T_2$ calculated as above.

The constant K which is multiplied as above will be explained below. The constant K is specific to the food item to be cooked and is an important factor for determining the finished condition of the food. Specifically, the constant K depends on the contents of protein, fat, water and the like components of the food involved or the type of food involved and therefore is required to be determined for each food item separately by an advance cooking test. In spite of the general belief that there may be an infinite variety of constants K for the existing variety of food, it is possible to classify the food items into several groups of food items having the same constant.

Figure 5:
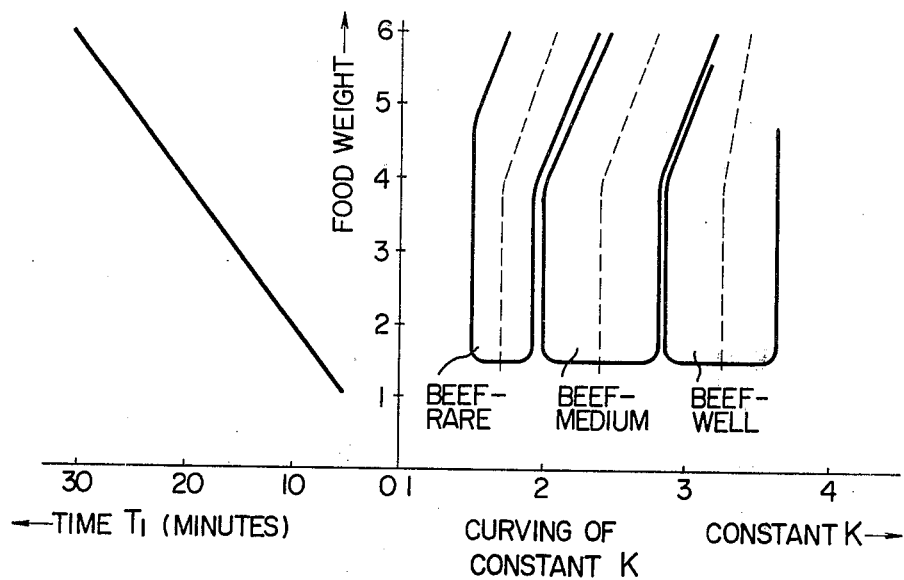
FIG. 5 is a diagram showing the relation between time $T_1$, the weight of the food to be cooked and the constant K thereof.

The result of the test conducted actually for determining a constant K is shown in FIG. 5. This test is associated with the beef which is representative meat. In cooking the beef, the desired finished conditions include welldone, medium and rare. As seen from FIG. 5, the weight of beef is proportional to the time $T_1$. But the constant K takes different values for different weights, so that the constant K changes for the weight of about 4 pounds and above. The reason may be that there is a difference in the amount of microwave power absorbed at the surface and the central part of the food. With the increase in weight, the outline dimension of the food increases, so that the microwave power that reaches the central part of the food is sharply decreased. For increasing the temperature of the central part of the food up to a proper level, therefore, the "carryover heating" intended to transfer the heat stored in the surface to the central part thereof plays an important role. For the effect of the carryover heating to penetrate the central part, the heating time is required to be lengthened. In view of the fact that time $T_1$ is proportional to the food weight, the time $T_2$ is required to be lengthened to increase the heating time. The test results of FIG. 5 show that a satisfactory final cooked condition is attained if the time length $T_2$ is calculated by changing the constant K at a time point corresponding to the weight of about 4 pounds, namely, after the lapse of time $T_1$ of 20 minutes.

The relation between the weight of the food to be cooked and the constant K is mentioned above. The manner in which the time length $T_2$ is calculated will be explained below. The automatic cooking with vapor sensor 31 goes through complicated processes of control which is unattainable without the aid of the microcomputer 30. A number of control operations are required including the calculation of the time length $T_1$ on the basis of the constant K, storage of the minimum humidity value, the cleaning of the humidity sensor and the like. The technological advance of the microcomputer has made possible detailed control and hence detailed automatic cooking in all aspects.

Let the weight of the food to be cooked be M, the heating time before detection of vapor be $T_1$, and the heating time after liberation of vapor be $T_2$. Then, $$T_1 = M \times K_1$$

$$T_2 = M \times K_2$$

where $K_1$ and $K_2$ are constants. From these equations, $$T_2 = T_1 \times (K_2/K_1)$$

$$= T_1 \times K$$

where K is a constant determined for each food item depending on the composition thereof. If the time length $T_1$ is known, the time length $T_2$ is obtained by multiplying the time length $T_1$ by the constant K. What is required of the microcomputer 30 is to count the time length $T_1$, to store the constant K as data, to multiply the time $T_1$ by the constant K, and to control the heating time of the microwave oven on the basis of these time data. It is thus possible to cook the food without measuring the weight of the food or setting the heating output or heating time but only by entering comparatively simple data of the food by way of the key pads 11 of the keyboard 12.

In heating food with microwave energy in a microwave oven, the amount of microwave energy absorbed into the surface of the food is larger than that absorbed into the central part thereof as mentioned above. Let the microwave power absorbed into the unit volume of the surface be Po, and the microwave power absorbed into the unit volume at the point distant by r from the surface be Pr. Then, $$Pr = Po\epsilon^{-Fr}$$

where F is a constant specific to the food being cooked. It is seen from this equation that with the increase in the distance r of the central part of the food, that is, with the increase in the size of the food, the amount of power absorbed at the central part of the food is sharply decreased. Unless the heating time is lengthened by a multiple of $\epsilon^F$ progressively with the increase in the food weight, therefore, the temperature of the central part of the food fails to reach the desired level. For this reason, the constant K is variously stored in the ROM of the microcomputer 30 depending on the weight, namely, the time length $T_1$ required before detection of vapor. The feature of the present invention lies in that the constant K is changed according to the vapor detection time in the microcomputer program.

Figure 6:
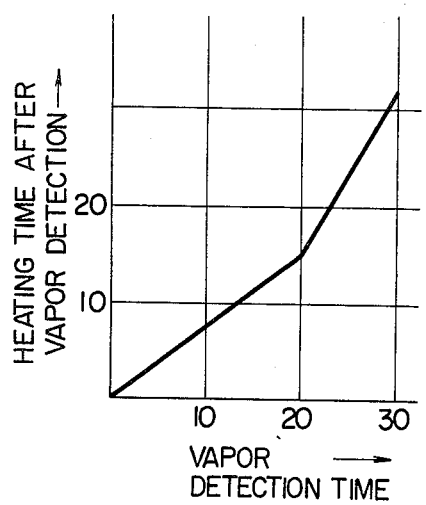
FIG. 6 is a diagram showing the relation between time lengths $T_1$ and $T_2$.
Figure 7:
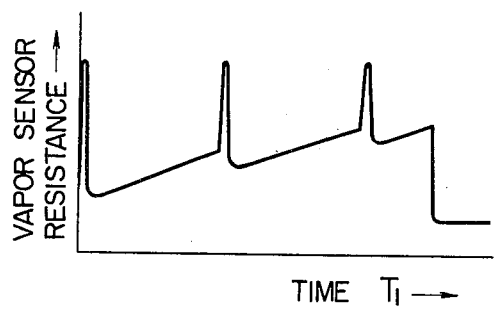
FIG. 7 is a diagram for explaining a controlled condition of a heater for cleaning by heating the vapor sensor.

An effective heating result is thus attained by a featured construction of the above-mentioned microwave oven. A diagram illustrating the relation between time $T_1$ and $T_2$ specifically is shown in FIG. 6.

The above-described vapor sensor 31 utilizes the fact that moisture is adsorbed on the surface thereof during humidity detection. In addition to moisture, the dust borne in the air and oil and the like liberated from the food being cooked are also adsorbed on the surface of the vapor sensor 31. This contamination gradually increases the resistance value of the vapor sensor 31. In comparison with the humidity detection in the atmospheric air, the vapor sensor 31 of the microwave oven is exposed to excessive contamination during the cooking processes. Thus the resistance characteristic of the vapor sensor 31 is sharply deteriorated with the result that the resistance value thereof tends to increase and the detecting ability thereof is deteriorated with the increase in the time length of exposure to the heating environment. Therefore, it is necessary to clean by heating the vapor sensor 31 to restore the resistance value thereof and thus to improve the sensing ability thereof once every several minutes or ten and several minutes during the cooking. Experiments show that such a cleaning should be performed at the rate of once every 20 minutes. The present invention is so constructed that the microcomputer program is such that a command for cleaning by heating of the vapor sensor 31 at predetermined time points during the cooking is programmed, thus making possible the heating operation with a very low cost without deteriorating the sensing ability of the vapor sensor 31.

In the case where vapor is liberated from the food during the cleaning by heating at the vapor sensor 31, the vapor sensor 31 is exposed to an environment having a very low humidity which it is difficult for it to detect. To obviate this inconvenience, the vapor is capable of being prevented from liberating from the food by suspending the oscillation of microwave energy during the cleaning by heating.

Still another feature of the present invention is that the program of the microcomputer 30 is so constructed as to temporarily turn off the high voltage switch 26 during the cleaning by heating of the vapor sensor 31 and thus to suspend generation of vapor from the food being cooked.

The above-mentioned construction features attain an accurate detection at very low cost.

The microcomputer 30 of the microwave oven counts the power frequency connected with the microwave oven, and also counts the time, heating time and time length $T_1$. The time length $T_1$ is counted in basic units of power frequency, and the resulting count of power frequency is multiplied by the constant K, thus determining the time length $T_2$.

This construction permits very stable and accurate calculation of the time length $T_1$, thus making possible accurate cooking.

What is claimed is:

1. A heating control apparatus for a microwave oven wherein an object to be cooked is placed in a heating chamber and heated by microwave energy radiated from a microwave generator, said heating control apparatus comprising:

a vapor sensor for sensing a change in the vapor content of air exhausted from said heating chamber;

counting means for determining the period of time $T_1$ from the instant that heating is started to the detection by said vapor sensor of a rapid increase in said vapor content thereby indicating the generation of vapor from said cooking object, said counted time period $T_1$ being proportional to the weight of said cooking object;

means for storing a plurality of constants for each of a plurality of predetermined kinds of cooking objects and for each of a plurality of said counted time periods $T_1$, said constants being functions of the weights of said cooking objects and therefore of the counted time periods $T_1$ for specific kinds of cooking objects;

means for selecting a value K of said constant corresponding to the kind of cooking object and to said time period $T_1$;

means for determining a further heating time period $T_2$ by multiplying said time period $T_1$ by said selected constant value K; and means for terminating the operation of said microwave generator after a total heating time consisting of the sum of said counted time period $T_1$ and said further heating period $T_2$, where $T_2 = KT_1$.

2. A heating control apparatus according to claim 1 which further comprises an electric resistive heater for heating said vapor sensor, said heater cleaning said vapor sensor once every several minutes during the time $T_1$ from the start of heating to detection by said vapor sensor of vapor liberated from said food.

* * * * *